March 2, 1948. E. H. HAUG ET AL 2,436,925
ELECTRIC REGULATING APPARATUS
Filed Dec. 31, 1943

Inventors:
Eugene H. Haug and
Fred A. Hansen,
By Davern, Orms and Booth,
Attorneys.

Patented Mar. 2, 1948

2,436,925

UNITED STATES PATENT OFFICE 2,436,925

ELECTRIC REGULATING APPARATUS

Eugene H. Haug, Chicago, and Fred A. Hansen, River Forest, Ill.

Application December 31, 1943, Serial No. 516,364

3 Claims. (Cl. 171—119)

This invention relates to electric regulating apparatus and more particularly to apparatus for controlling the supply of current to a load from an alternating current source.

One of the objects of the invention is to provide electric regulating apparatus in which the resonant circuit principle is employed to control the supply of current to a load from an alternating current source. By proper proportioning of the circuit constants the load can be supplied with constant voltage, constant current or constant wattage.

Another object of the invention is to provide an electric regulating apparatus in which the capacitative branches of the circuit require only a small capacitance.

Still another object of the invention is to provide electric regulating apparatus which is substantially surge proof. This is particularly important for uses such as welders where the load is irregular.

A further object of the invention is to provide electric regulating apparatus which performs the desired regulating functions and at the same time replaces the usual transformer.

The above and other objects and advantages of the invention will be more readily apparent from the following description when read in connection with the accompanying drawing, in which—

Figure 1:
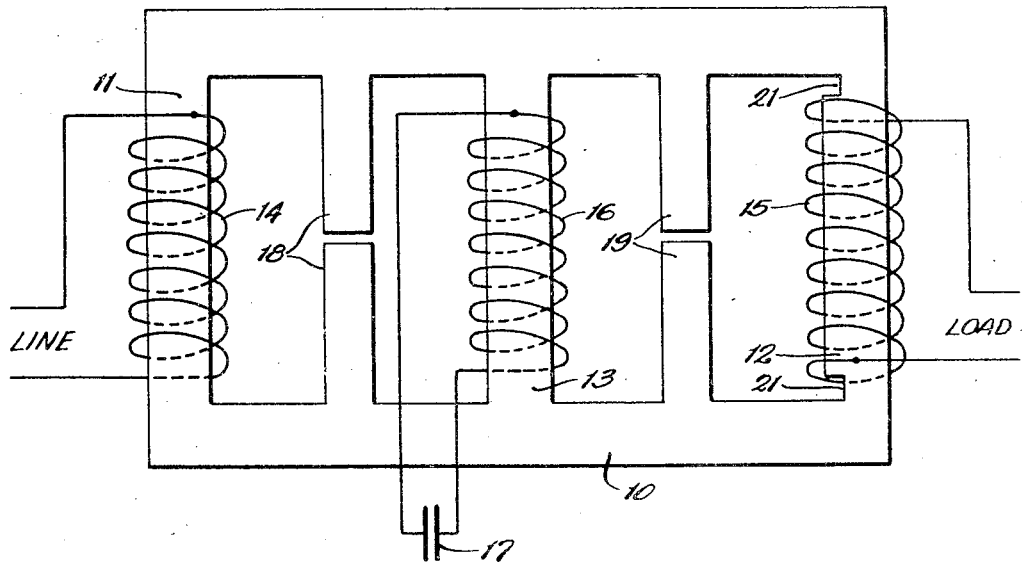
Figure 1 is a diagrammatic view of an apparatus embodying the invention.

As shown in Figure 1, the apparatus comprises a substantially rectangular core 10 having end legs 11 and 12 and a central leg 13. A primary winding 14 is wound on the leg 11 and is connected to any desired source of alternating current. A secondary winding 15 is wound on the leg 12 and is connected to a load. The windings 14 and 15 act both as capacitative reactors for the regulating circuit and as transformer windings and it will be understood that the respective numbers of turns therein may be proportioned as desired to obtain the desired transformer action.

Figure 2:
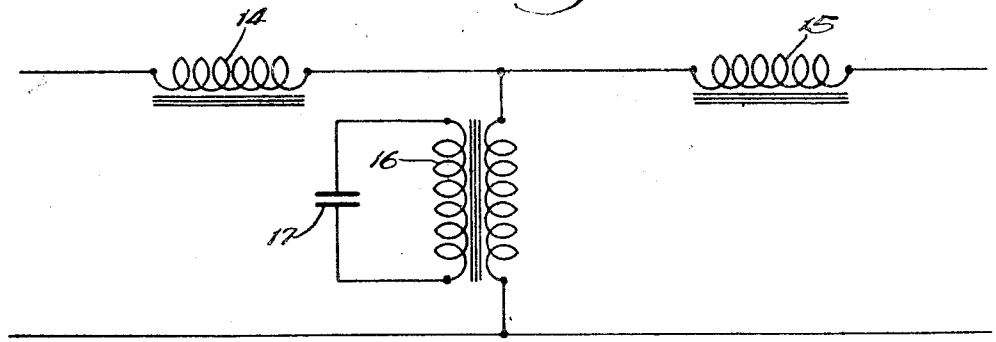
Figure 2 is a net work diagram.

The central leg 13 carries a winding 16 across which is connected a condenser 17. The network as so far described is substantially as shown in Figure 2 in which the condenser 17 is effectively connected across the line between the inductances 14 and 15 to form a T-resonant circuit.

The core is provided between the legs 11 and 13 with inwardly projecting arms 18 spaced apart at their inner ends to provide a magnetic air gap. Similar arms 19 are provided on the core between the legs 12 and 13.

In operation the condenser 17 introduces a leading flux and therefore a leading current into both the input and output windings. The first magnetic air gap provided by the arms 18 introduces a lagging flux into the primary winding 14, and at resonance the leading and lagging fluxes are equal so that there will be unity power factor in the primary winding. Similarly, the air gap provided by the arms 19 introduces a lagging flux into the secondary and when this is in resonance with the leading flux produced by the condenser, the secondary will operate at unity power factor.

For certain applications, such for example as welding, the leg 12 of the core may be operated near the knee of its saturation curve so that the voltage induced in the secondary can never substantially exceed the desired value. For this purpose the leg 12 may be constructed to saturate prior to the other parts of the core. This may be accomplished by forming the leg 12 of a high mu metal such as "Permalloy" or by restricting the cross sectional area of the leg. As shown in Figure 1 the leg 12 is notched at 21 adjacent its opposite ends to provide a smaller effective cross sectional area than the remainder of the core so that it will be saturated.

It will be noted that the circuit as described not only produces regulation in the manner of a conventional T-resonant circuit but also replaces the transformer which is normally used in connection with conventional regulators. Since the primary and secondary are inductively coupled the apparatus is substantially surgeproof due to the time lag required to build up the flux density in the core. This apparatus can therefore be used very effectively for intermittent loads such as welders.

The provision of the condenser connected across a separate winding on the core enables a very small condenser to be employed to introduce a relatively large capacitance into the circuit. Due to this manner of connection the condenser is never subjected to extreme high voltages such as might be caused by surges and therefore need not be designed with a high safety factor. The arrangement also provides a high degree of flexibility in varying the circuit constants so that substantially any desired type of regulation can be performed.

While one embodiment of the invention has been shown and described in detail herein, it

What is claimed is:

1. Electric regulating apparatus comprising a core of magnetic material having three interconnected legs, a winding on one of the legs connected to a source of alternating current, a winding on another of the legs connected to a load, a winding on the third leg, and a condenser connected across the last named winding, said other of the legs being so constructed and arranged that it will saturate prior to the remainder of the core.

2. Electric regulating apparatus comprising a core of magnetic material having three interconnected legs, a winding on one of the legs connected to a source of alternating current, a winding on another of the legs connected to a load, a winding on the third leg, and a condenser connected across the last named winding, said other of the legs having a portion of smaller cross section than the first and third legs whereby it will saturate prior to the remainder of the core.

3. Electric regulating apparatus comprising a generally rectangular core having end legs and a central leg, a winding on one end leg connected to a source of alternating current, a winding on the other end leg connected to a load, a winding on the central leg, a capacitance connected across the last named windings, and projecting members on the core between the end legs respectively and the central leg forming magnetic air gaps, said other of the end legs being so constructed and arranged that it will saturate prior to said one end leg or the central leg.

EUGENE H. HAUG.
FRED A. HANSEN.

REFERENCES CITED

The following references are of record in the file of this patent:

UNITED STATES PATENTS

| Number | Name | Date |
|---|---|---|
| 2,207,234 | Bohm | July 9, 1940 |
| 2,212,198 | Sola | Aug. 20, 1940 |